United States Patent
Waters et al.

[11] Patent Number: 6,129,458
[45] Date of Patent: Oct. 10, 2000

[54] CACHE OPTIMIZATION METHOD

[75] Inventors: John H. Waters, Columbia; Hiram B. Curry, Jr., Charleston, both of S.C.

[73] Assignee: AT&T Global Information Solutions Company, Dayton, Ohio

[21] Appl. No.: 08/216,907

[22] Filed: Mar. 23, 1994

[51] Int. Cl.[7] .............................. G06F 11/34; G06F 12/00
[52] U.S. Cl. ............................ 395/460; 364/DIG. 1; 364/DIG. 2; 364/964; 364/964.2; 364/964.34; 364/243; 364/243.4; 364/243.44; 364/243.5
[58] Field of Search .................. 364/DIG. 1 MS File, 364/DIG. 2 MS File; 395/401, 420, 427, 440, 445, 460, 461, 477

[56] References Cited

U.S. PATENT DOCUMENTS

| | | | |
|---|---|---|---|
| 4,825,412 | 4/1989 | Sager et al. | 365/49 |
| 4,860,192 | 8/1989 | Sachs et al. | 364/200 |
| 4,928,239 | 5/1990 | Baum et al. | 364/200 |
| 4,985,829 | 1/1991 | Thatte et al. | 364/200 |
| 5,003,459 | 3/1991 | Ramanujan et al. | 364/200 |
| 5,073,851 | 12/1991 | Masterson et al. | 395/425 |
| 5,113,506 | 5/1992 | Moussouris et al. | 395/400 |
| 5,226,133 | 7/1993 | Taylor et al. | 395/400 |
| 5,452,440 | 9/1995 | Salsburg | 395/460 |

*Primary Examiner*—Robert B. Harrell
*Attorney, Agent, or Firm*—Paul W. Martin

[57] ABSTRACT

A cache optimization method which analyzes an existing cache mapping scheme and determines a new cache mapping scheme that eliminates cache collisions. In a first embodiment, an application is traced while running in its main working set by a processor to obtain cache access statistics for objects within the working set under the first caching scheme. The cache access statistics are analyzed to obtain collision information which reveals lines of operating memory that collide in cache memory. Addresses are assigned to the objects using a cache-miss prediction algorithm. If the cache memory is too small to store all of the objects within the working set, the working set is divided into a plurality of working subsets which each contain a smaller number of objects than the working set. Finally, system calls are executed by the processor to effect the second cache mapping scheme. In a second embodiment, a rearrangement of functions within the application is determined using the cache-miss prediction algorithm and the functions are link edited in accordance with the determined rearrangement.

5 Claims, 3 Drawing Sheets

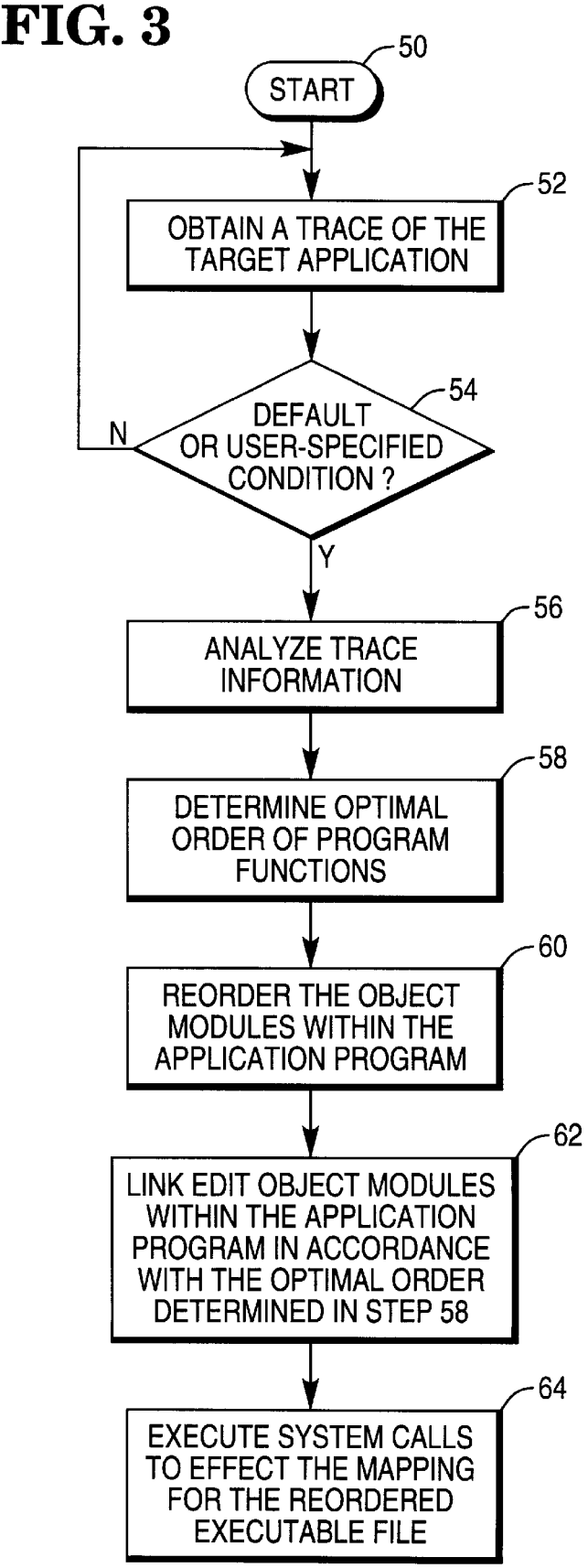

CACHE OPTIMIZATION METHOD

BACKGROUND OF THE INVENTION

The present invention relates to cache memories in computers and more specifically to a cache optimization method.

Computers maintain copies of frequently-used instructions and data in cache memories. Whenever an executing application accesses a line of operating memory, that line is mapped and copied to a slot of the cache memory. The choice of which cache memory slot to use is typically a function of the physical address of the memory line. A performance gain is realized when a computer accesses a needed line from the cache memory, instead of the computer's random-access memory (RAM) or virtual memory.

Because the computer's RAM is always larger than the cache memory, many lines of memory will of necessity map to the same cache memory slot. A collision occurs whenever the cache memory does not contain an accessed memory line and another line must be purged from the slot to make room for the new line. Collisions prevent computers from realizing the full performance potential of their cache memories.

An application that is larger than cache memory is at risk of colliding with itself in the cache memory, even though the cache memory is large enough to hold the frequently-accessed memory lines. The risk is higher in computers that use virtual memory since applications are isolated from knowledge of actual physical addresses. The risk is also higher in multi-tasking environments, since greater demands are put on the cache memory.

The collision problem is much greater today due to layered software development techniques which produce a random distribution of the application working set. The application "working set" is defined as the subset of instructions needed to perform a task. Layered software development simplifies the task of large software development by defining layers of software and assigning a group of developers to each layer. Standard programming techniques then assign contiguous addresses linking code within a given layer. The execution of an application program developed in this way moves from layer to layer.

Large layered application programs running on computers with virtual memory map the working set to the cache memory in a random manner. However, simple statistical analysis shows that random mapping fails to make optimal use of the cache memory. For example, if the size of the working set is equal to the size of the cache memory, a random mapping will on average make use of only sixty-three percent of the cache memory. Thirty-seven percent of the cache memory will on average never be used, even though the cache memory is large enough to hold the entire working set. Thus, collisions occur with an increased risk of line thrashing in code loops.

Therefore, it would be desirable to provide a cache optimization method that minimizes collisions and provides a performance gain over existing cache control methods.

SUMMARY OF THE INVENTION

In accordance with the teachings of the present invention, a cache optimization method is provided. In a first embodiment, an application is traced while running in its main working set by a processor to obtain cache access statistics for objects within the working set under the first caching scheme. The cache access statistics are analyzed to obtain collision information which reveals lines of operating memory that collide in cache memory. Addresses are assigned to the objects using a cache-miss prediction algorithm. If the cache memory is too small to store all of the objects within the working set, the working set is divided into a plurality of working subsets which each contain a smaller number of objects than the working set. Finally, system calls are executed by the processor to effect the second cache mapping scheme.

In a second embodiment, an application is traced while running in its main working set by a processor to obtain cache access statistics for objects within the working set under the first caching scheme. The cache access statistics are analyzed to obtain collision information which reveals lines of operating memory that collide in cache memory. A second mapping scheme is determined by determining a rearrangement of functions within the application using a cache-miss prediction algorithm and link editing the functions in accordance with the determined rearrangement. Finally, system calls are executed by the processor to effect the second cache mapping scheme.

It is accordingly an object of the present invention to provide a cache optimization method.

It is another object of the present invention to provide a cache optimization method which analyzes program execution and provides an optimal mapping of virtual pages to cache collections.

It is another object of the present invention to provide a cache optimization method which analyzes program execution, determines an optimal order for program functions, and re-links the program functions together in the optimal order.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 3 is a flow diagram illustrating a second embodiment of the cache optimization method of the present invention.

DETAILED DESCRIPTION OF THE PREFERRED EMBODIMENT

Figure 1:
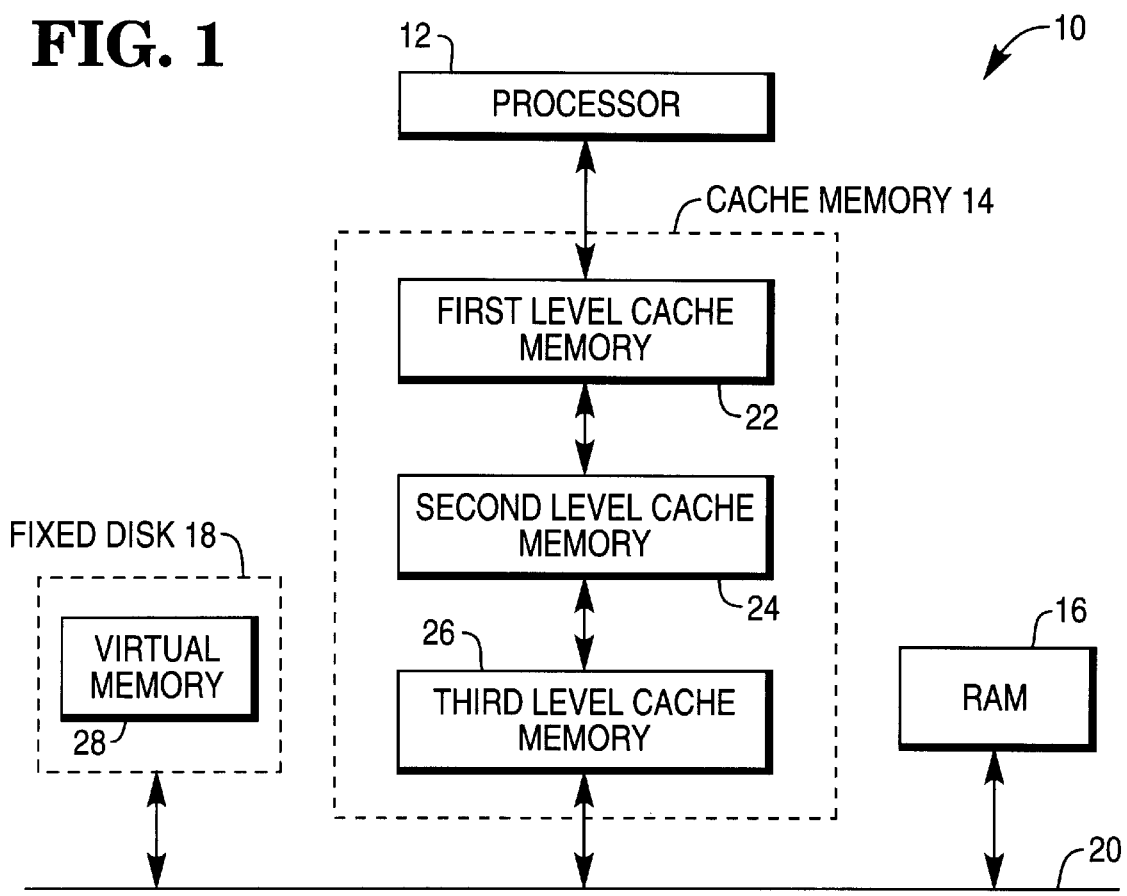
FIG. 1 is a block diagram of a computer containing a cache memory.

Referring now to FIG. 1, computer 10 includes processor 12, cache memory 14, random-access memory (RAM) 16, fixed disk drive 18, and system bus 20.

Processor 12 is preferably an Intel processor, although other types of processors are also envisioned.

Cache memory 14 includes at least first level cache memory 22. It may typically include second level cache memory 24. In some computers, it may also include third level cache memory 26. For Intel 386 and higher processors, first level cache memory 22 is located within the processor circuitry. Cache memory 14 typically includes static RAM (SRAM) chips or fast dynamic RAM (DRAM) chips.

RAM 16 is the main memory of computer 10 and is typically less-expensive DRAM chips. Processor 12 loads application programs and data into lines of main memory, from which processor 12 accesses these lines and stores them in cache memory 14.

Fixed disk 18 is typically a hard disk and its associated drive, in which application programs and data are stored. A portion of fixed disk 18 may also be used as virtual memory 28.

System bus 20 connects processor 12, through cache memory 14, to fixed disk 18 and RAM 16.

Figure 2:
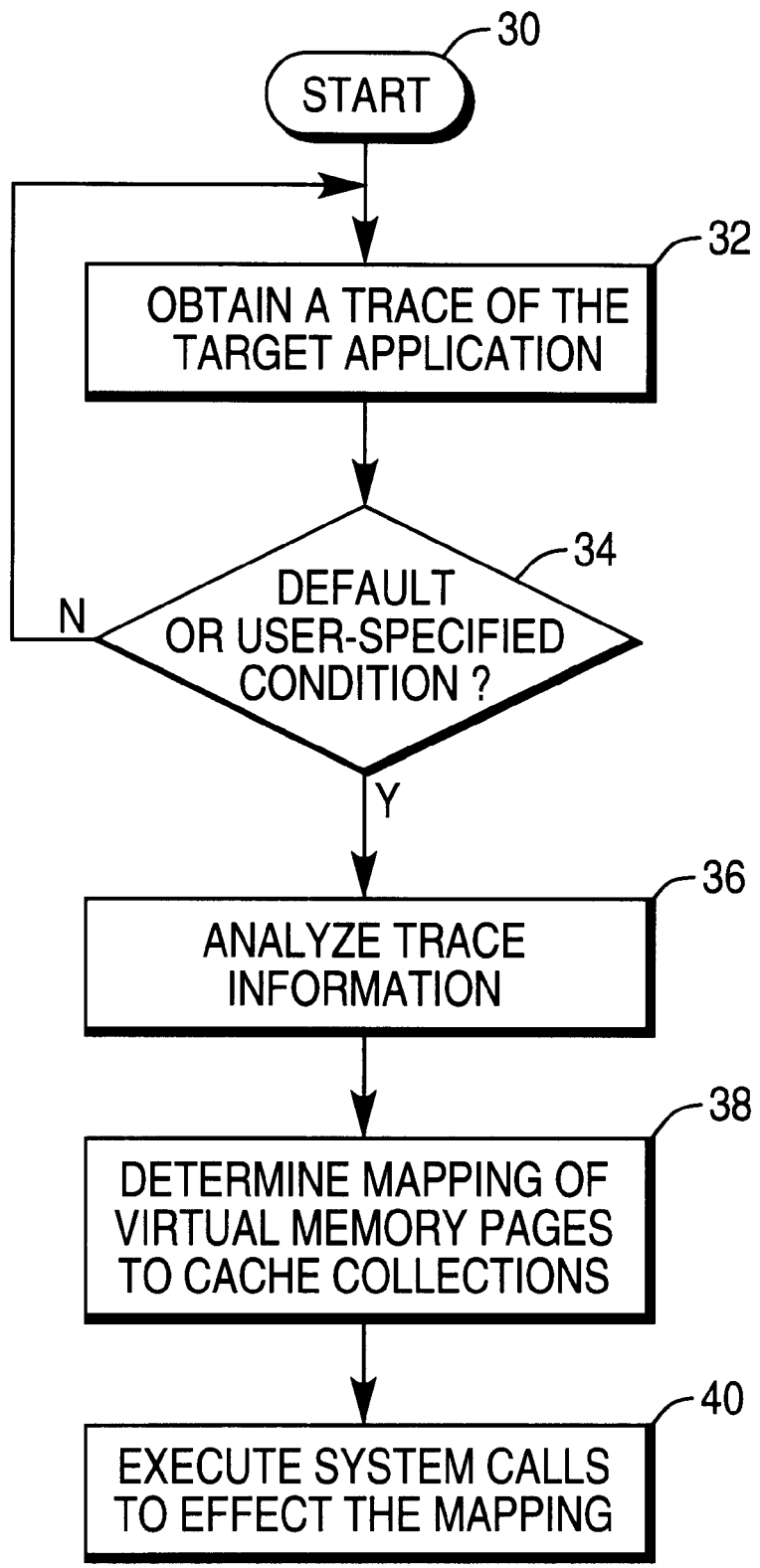
FIG. 2 is a flow diagram illustrating a first embodiment of the cache optimization method of the present invention.

Turning now to FIGS. 2 and 3, the method of the present invention analyzes the way a program uses cache memory 14 of processor 12 on which an application program is running. It then improves the program's use of cache memory 14 by moving parts of the program to locations within physical memory such that contention for limited cache memory space is minimized. The result is more efficient use of cache memory 14, which in turn speeds system performance by reducing access time to program components and by reducing traffic between processor 12 and RAM 16 over system bus 20.

The method provides two ways to speed execution of an application program: 1) re-mapping to cache memory 14, and 2) re-linking. Both embodiments change the way application text maps to cache memory 14, and both embodiments base their optimizations on an address trace of application instructions. In the ideal case, both embodiments provide mappings which on average make use of one-hundred percent of cache memory 14 for a working set equal to the size of cache memory 14.

With reference to FIG. 2, the first embodiment, optimizing without re-linking, involves moving the contents of memory from one set of physical memory pages to another. The method begins at START 30.

In step 32, a trace of a target application is taken while it is running in its main working set of activity. For bench marking and database applications, trace measurements are taken while these applications are in a steady state.

Trace information may be obtained using commercially available hardware or software products, such as application debuggers. The trace consists of user-space virtual text addresses that are executed by an identified process. These addresses are written as the ASCII representation of hexadecimal integers, each followed by a new line character. Command line options allow a user to control the starting, stopping, and duration of the trace.

In step 34, execution is traced until default or user-specified conditions are met.

In step 36, the trace information is analyzed. The analysis reveals areas within the application text that collide in cache memory 14. Access counts of addresses that point to application objects (functions, basic blocks, pages, etc.) are gathered.

In step 38, the method assigns new addresses to the application objects using known cache-miss prediction algorithms. Thus, cache mappings that minimize cache collisions for these objects are created. The mapping is one of virtual memory pages to "cache collections". A cache collection is a distinct partition of cache memory 14 that caches a page of the application program. The mapping is represented as a list of ordered pairs: virtual page addresses and cache collections. The proposed mapping offers higher performance than occurs when the traced application repeats the thread of control of the application program represented by the trace information.

When application working sets are too large to fit into cache memory 14, the method uses the concept of temporal locality to create smaller, temporally contiguous windows of execution called temporal frames. Temporal frames may be defined by dividing the application trace into time blocks, which correspond to subsets of the main working set of instructions. When enough temporal frames are defined, the smaller working subsets of application instructions within these frames can become small enough so that the objects associated with each subset of instructions fit within cache memory 14. The objects within these frames are then mapped using the known cache-miss prediction algorithms.

In step 40, the list of ordered pairs is then used to execute system calls to effect the virtual-page-to-cache-collection mapping suggested by the collision information. Addresses successfully mapped to distinct cache collections can never suffer a cache collision.

With reference to FIG. 3, the second embodiment, optimizing with re-linking, involves link editing an executable file in an optimized fashion. The re-linking embodiment uses the same principles as the non-linking embodiment but achieves finer granularity in the size of memory objects it relocates. The method begins at START 50.

In step 52, a trace of a target application is taken while it is running in its main working set of activity.

In step 54, execution is traced until default or user-specified conditions are met.

In step 56, the trace information is analyzed. The analysis reveals areas within the program text that collide in cache memory 14. Access counts of addresses that point to application objects (functions, basic blocks, pages, etc.) are gathered.

In step 58, the trace information is used by a known cache-miss prediction algorithm to determine an order in which to link edit program functions. The order is optimal and results in a more efficient use of cache memory 14 than when the traced executable file executes the thread of control represented by the trace information.

Optimization is based on the assumption that consecutive pages of virtual address space will map to consecutive cache collections. When cache collections are exhausted, wrap around occurs and the next page of virtual address space is mapped to cache collection zero.

In step 60, the method changes the order of the object modules within the application program.

In step 62, the method uses a commercially available linker program to link edit object modules within the application program in accordance with the optimal order determined in step 58. The method provides a new and improved executable file. Alternatively, when the source code of an application program is available, the source code may be compiled to form object modules which are then ordered and linked to form an optimal executable file.

In step 64, system calls are executed to effect the virtual-page-to-cache-collection mapping for the new executable file.

Advantageously, both embodiments of the method of the present invention have universal applicability with no requirement for changes to hardware or to the programs targeted for enhanced performance.

Application programs that spend at least 55% of their time executing user code that follows the same thread of control as was traced show at least a 10% performance gain. At least 1% performance gain is achieved through page movement alone.

Both embodiments are capable of caching virtual memory 28. Operating system support is provided to coordinate the actual mapping of application objects to physical memory addresses. This is done via collection-based free lists (CBF). Using CBF, the method can assign virtual addresses with the understanding that even though the actual physical address of a given object is not predictable, its placement in cache memory 14 is.

An operating system modified with CBF maintains multiple lists of free memory pages. Pages on a given free list share a common mapping to cache memory 14. One free list exists for each cache collection in the largest cache in the system.

When a page is requested to be put into a specific cache collection, the appropriate list of free pages is used in an attempt to service the request. If the appropriate free list is empty, the request fails. In the course of normal page allocations (where no specific cache mapping is specified) free pages are pulled, one each, from lists for consecutive cache collections. If a free list is empty, it is silently skipped.

Although the present invention has been described with particular reference to certain preferred embodiments thereof, variations and modifications of the present invention can be effected within the spirit and scope of the following claims.

What is claimed is:

1. A method for optimizing the storage of a working set of a plurality of lines of operating memory into a cache memory during execution of an application by a processor including the steps of:

(a) tracing the application while it is running in the working set by the processor to obtain trace information. including cache access statistics for objects within the working set under a first caching scheme;

(b) analyzing the cache access statistics by the processor to obtain collision information which reveals lines of operating memory that collide in cache memory;

(c) determining a second cache mapping scheme which eliminates collisions between lines of operating memory by the processor, including the substep of:

(c-1) assigning addresses to the objects using a cache-miss prediction algorithm; and (d) executing system calls by the processor to effect the second cache mapping scheme.

2. The method as recited in claim 1, wherein step (c) further comprises the substep of:

(c-2) dividing the working set into a plurality of working subsets which each contain a smaller number of objects than the working set; and (c-3) assigning new addresses to the objects within each working subset using the cache-miss prediction algorithm.

3. The method as recited in claim 1, wherein substep (c-2) comprises the substep of:

(c-2-A) dividing the trace information into a plurality of contiguous time blocks.

4. A method for optimizing the storage of a working set of a plurality of lines of operating memory into a cache memory during execution of an application by a processor including the steps of:

(a) tracing the application while it is running in the working set by the processor to obtain cache access statistics for objects within the working set under a first caching scheme;

(b) analyzing the cache access statistics by the processor to obtain collision information which reveals lines of operating memory that collide in cache memory;

(c) determining a second cache mapping scheme which eliminates collisions between lines of operating memory by the processor, including the substeps of:

(c-1) determining an order in which to rearrange functions within an executable file within the application using a cache-miss prediction algorithm; and (c-2) link editing the functions to rearrange them into a new executable file; and (d) executing system calls by the processor to effect the second cache mapping scheme.

5. A method for optimizing the storage of a working set of a plurality of lines of operating memory into a cache memory during execution of an application by a processor including the steps of:

(a) tracing the application while it is running in the working set by the processor to obtain cache access statistics for objects within the working set under a first caching scheme;

(b) analyzing the cache access statistics by the processor to obtain collision information which reveals lines of operating memory that collide in cache memory;

(c) determining a second cache mapping scheme which eliminates collisions between lines of operating memory by the processor, including the substeps of:

(c-1) compiling source code corresponding to an executable file within the application into object modules;

(c-2) determining an order in which to arrange the object modules using a cache-miss prediction algorithm;

(c-3) linking the object modules to form a second executable file; and (c-4) replacing the one executable file with the second executable file; and (d) executing system calls by the processor to effect the second cache mapping scheme.

* * * * *

UNITED STATES PATENT AND TRADEMARK OFFICE
CERTIFICATE OF CORRECTION

PATENT NO.    : 6,129,458
DATED         : October 10, 2000
INVENTOR(S)   : John H. Waters et al.

It is certified that error appears in the above-identified patent and that said Letters Patent is hereby corrected as shown below:

<u>Title page,</u>
Item [73], Assignee, delete "AT&T Global Information Solutions Company"
insert -- NCR Corporation --.

Signed and Sealed this

Twenty-third Day of July, 2002

Attest:

Attesting Officer

JAMES E. ROGAN
*Director of the United States Patent and Trademark Office*